Patented Nov. 24, 1936

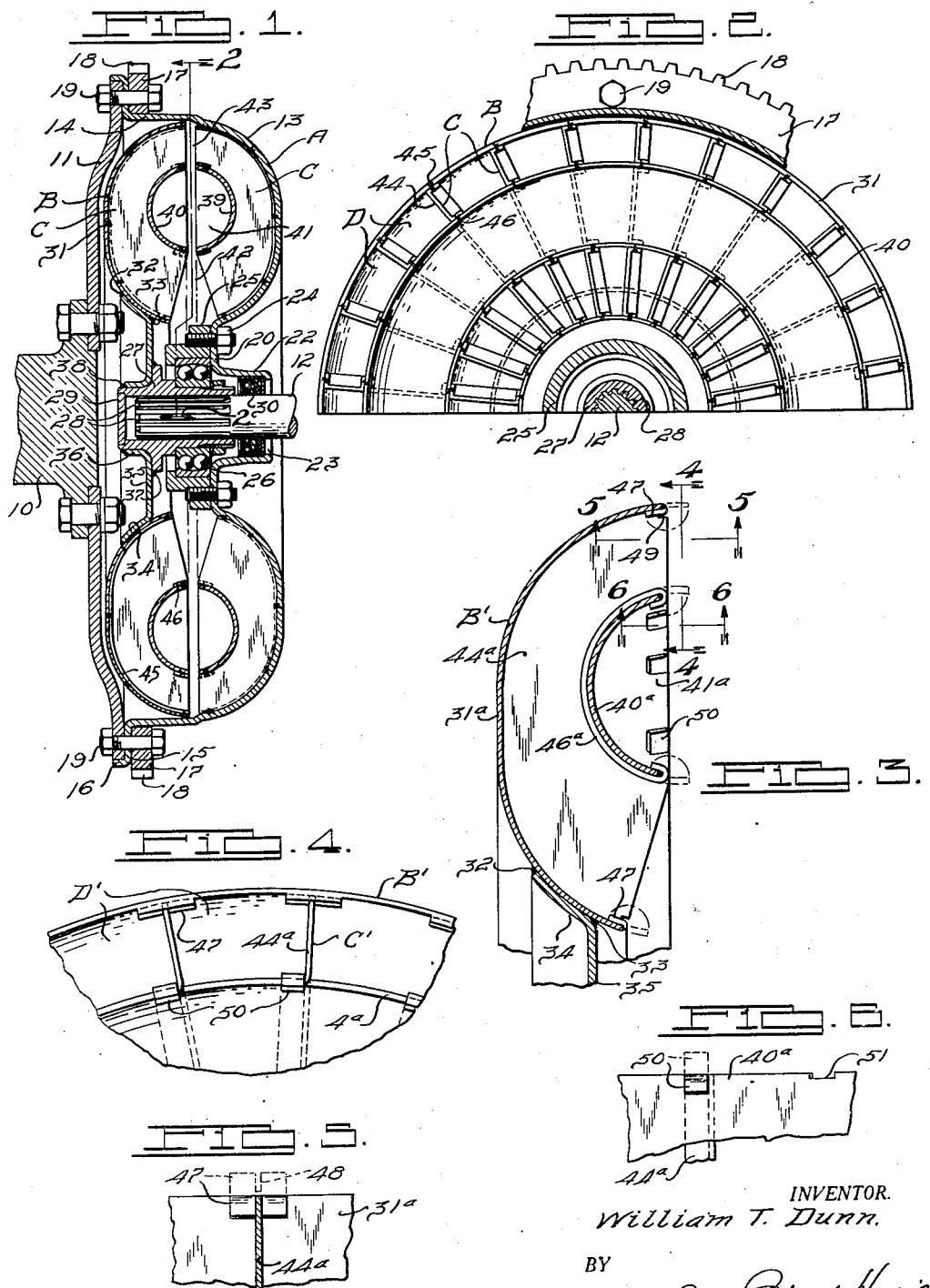

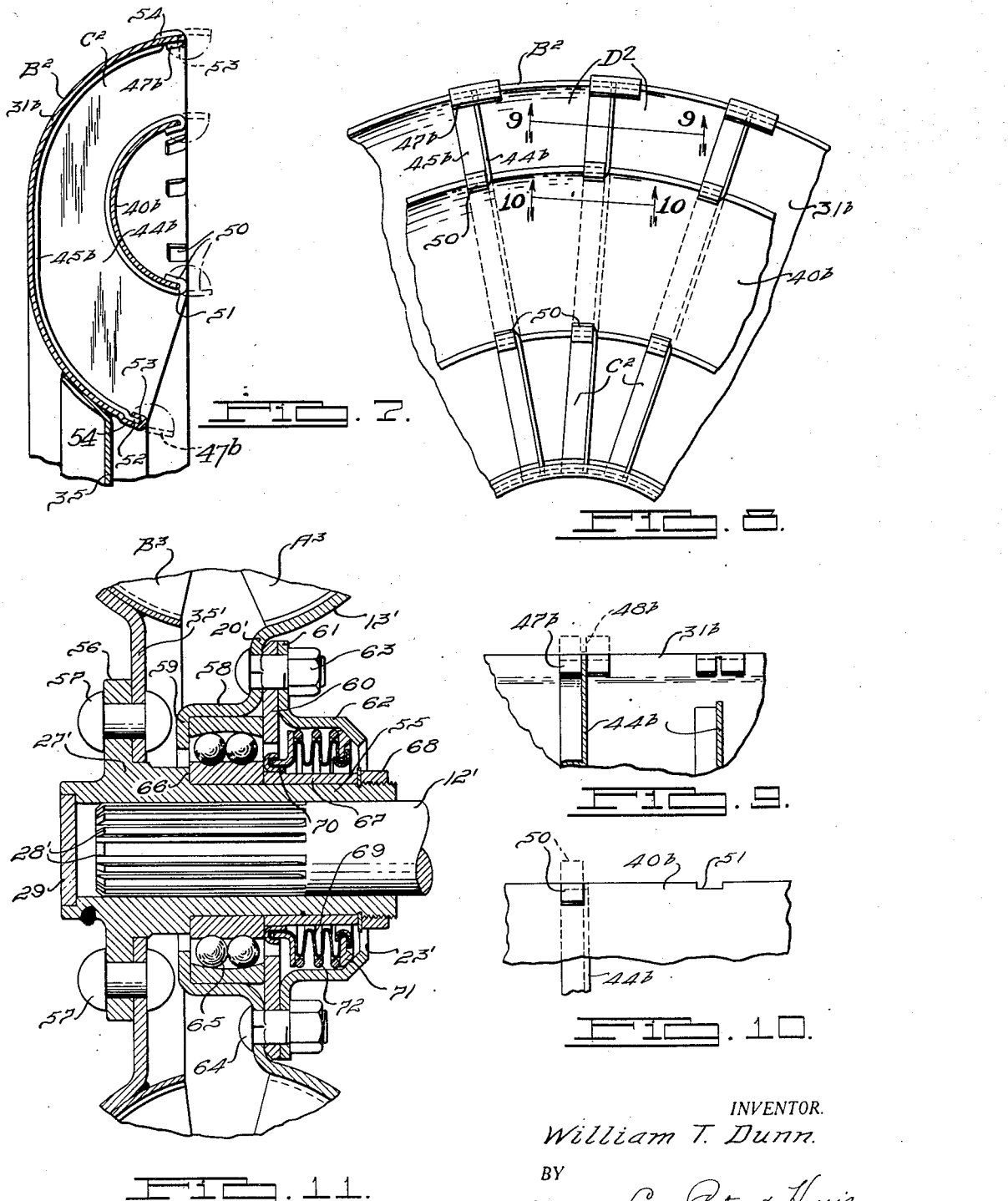

2,061,997

UNITED STATES PATENT OFFICE 2,061,997

POWER TRANSMITTING DEVICE

William T. Dunn, Detroit, Mich., assignor to Chrysler Corporation, Detroit, Mich., a corporation of Delaware Application May 14, 1934, Serial No. 725,572

10 Claims. (Cl. 103—115)

This invention relates to power transmitting devices and refers more particularly to fluid couplings, clutches, drives and the like.

It is an object of my invention to provide an improved fluid coupling capable of manufacture at relatively low cost; to provide a coupling of improved performance and efficiency; and to provide improved and more efficient characteristics of the fluid flow within the coupling.

A further object of my invention is to provide a fluid coupling of relatively light weight and low manufacturing cost without sacrificing the desired requisite strength and resistance to objectionable distortion.

In carrying out the foregoing objects of my invention, I have provided a novel coupling structure principally fabricated from sheet metal stampings, the stamped parts being secured in the assembly against displacement by the circulating fluid medium. A relatively small number of metal stampings are employed in my construction to form the vanes and the vane cover structure, these stampings being fashioned and assembled in a novel manner for attaining the objects set forth above.

In one embodiment of my invention the vanes and covers assembled therewith are mechanically connected together preferably by bending or deforming parts of the structural assembly into locking engagement with other parts thereof; in another embodiment the parts of the structural assembly are connected together by welding, it being apparent that combinations of these methods of connecting the parts may be employed if desired.

A further object of my invention in the more limited aspects thereof is to provide improved means particularly from standpoints of low cost and manufacture for attaching the impeller member of the fluid coupling to the power driving means. Where the impeller is attached to the flywheel of an internal combustion engine, such arrangement being customary where the fluid coupling is used to transmit the power to motor vehicles, I have provided improved means for mounting the flywheel starting gear ring in the assembly which includes the engine flywheel and the impeller.

An additional object of my invention resides in the provision of a novel means for mounting the fluid coupling members on the driven shaft and for sealing the shaft against the escape of the fluid medium from the fluid coupling.

Further objects and advantages of my invention will be apparent from the following detailed illustrative embodiments of the principles of my invention, reference being had to the accompanying drawings in which:

Fig. 1 is a sectional elevational view axially through my improved coupling.

Fig. 2 is an elevational view partly in section showing a typical portion of the runner, the view being taken along the line 2—2 of Fig. 1.

Fig. 3 is an enlarged fragmentary sectional view of a fluid coupling rotor member illustrating a modified form of my invention.

Fig. 4 is a detailed fragmentary side elevation view of a portion of the rotor illustrated in Fig. 3, the view being taken as indicated by the line 4—4 in Fig. 3.

Fig. 5 is a fragmentary sectional view of a portion of the rotor shown in Fig. 3, the section being taken along the line 5—5 of Fig. 3.

Fig. 6 is a further detail fragmentary view of a portion of the rotor illustrated in Fig. 3, the view being taken as indicated by the line 6—6 of Fig 3.

Fig. 7 is a fragmentary sectional view of a fluid coupling rotor illustrating a further modified form of my invention.

Fig. 8 is a fragmentary side elevational view of the rotor illustrated in Fig. 7.

Figs. 9 and 10 are detail fragmentary sectional views respectively along the lines 9—9 and 10—10 of the rotor illustrated in Fig. 8.

Fig. 11 is a sectional view of a modified form of rotor mounting means and sealing means for the fluid medium.

In the drawings and referring particularly to Figs. 1 and 2, reference character A represents the impeller of the fluid coupling and B designates the runner, the coupling being shown for illustrative purposes transmitting the drive from an engine crankshaft 10 and flywheel 11 carried thereby to a driven shaft 12 which may be connected to the driving wheels (not shown) of a motor vehicle in the well-known manner. My coupling may, of course, be employed to provide a driving connection between the parts of various machines or devices and is not limited in its useful application to motor vehicle drives.

The impeller or rotor A has a stamped sheet metal vane carrying outer cover plate 13 dished as illustrated in Fig. 1 and extending around the axis of the fluid coupling assembly as provided by the aligned axes of crankshaft 10 and driven shaft 12. As will be more presently apparent, the outer cover plate 13 cooperates with the flywheel 11 to house the impeller and runner structures together with the fluid medium circulated therein, the outer cover plate 13 thereby forming the rear casing of the coupling.

The outer cover plate 13 is provided with a forwardly extending annular flange 14 bent outwardly at 15 into contact with the rear peripheral face of flywheel 11, the flange 15 terminating outwardly in a forwardly bent annular flange 16 engaging the periphery of flywheel 11. Fitting in the angular pocket provided by the flange 15 and the forwardly extending portion 14 is the ring 17 formed with the starter teeth 18 adapted for engagement with the usual engine starting device not illustrated herein but of well-known construction. It will be apparent that the starter ring gear 17 is separately formed from the flywheel 11, such construction permitting the flywheel to be formed of a stamping from relatively low-cost material lending itself readily to the stamping operation, the starter ring gear 17 being formed of a harder, higher-grade steel. The starter ring gear, outer cover plate 13 and flywheel 11 are rigidly secured together as a unitary construction by a circumferential series of fastening devices indicated at 19.

The cover plate 13 extends inwardly to provide an annular web portion 20 and then rearwardly to form the hub portion 22 having an opening 23 for receiving shaft 12. Suitably secured to web 20 as by fasteners 24 is a carrier ring 25 receiving the ball bearing assembly 26, the latter being supported by a hub 27 drivingly connected by splines or teeth 28 to shaft 12. A fluid seal 29 closes the forward opening of hub 27 to prevent passage and escape of the fluid medium from the coupling rearwardly along the shaft 12. A further fluid sealing assembly 30 surrounds the shaft 12 in contact with the hub portion 22 to prevent escape of the fluid medium through the opening 23. The seal 29 may be dispensed with, if desired, since in Fig. 1 the seal 30 engages the shaft 12. The seal 29 is of greater significance in my Fig. 11 modified embodiment as will be presently more apparent.

From the foregoing it will be apparent that the impeller A is drivingly connected to flywheel 11 and is supported and centered on driven shaft 12 but rotatable independently thereof. The runner B is encased by the flywheel 11 and the outer cover plate 13 of impeller A, this casing being filled or partially filled with the fluid medium which may be oil, water, or other suitable fluid.

Before describing the generally similar details of the vane structure for the impeller and runner, it will be noted that the runner B has an oppositely dished cover plate 31 formed of a sheet metal stamping and adapted to carry the vanes of the runner as will be presently apparent. This outer cover plate is suitably secured as by welding at 32, 33 to the annular flange 34 of the stamped disc 35, the latter having a forwardly bent flanged hub 36 suitably secured as by welding at 37, 38 to the aforesaid hub 27.

The impeller A is provided with the stamped sheet metal inner cover plate 39 spaced within the outer cover plate 13 and correspondingly dished, this inner cover plate extending ring-like about the axis of shaft 12, the inner cover plate being substantially semi-circular in cross section. The runner B is also provided with a similar inner cover plate 40 spaced within the outer cover plate 31, these inner cover plates 39 and 40 together providing a vortex chamber 41 for the fluid which circulates between the impeller and runner around the vortex chamber as will be presently more apparent.

The rotors A and B may have vane forming structures of generally similar construction, the typical structure being best illustrated in Fig. 2 in connection with the runner B. Intermediate the inner and outer cover members 40 and 31 respectively are located a series of circumferentially spaced stamped sheet metal vane forming members C which extend substantially radially from the low pressure chamber or zone 42 to the high pressure chamber or zone 43, these chambers being provided by circumferential clearance spaces between the oppositely facing portions of the impeller A and runner B.

The members C have radially extending vane portions 44 integrally formed with circumferentially extending outer and inner web or flange portions 45 and 46 respectively. Each web portion 45 is shaped to conform with the dished outer cover plate 31, the webs engaging the inner surface of this outer cover plate and being secured thereto by welding. In similar manner the inner webs 46 engage the inner cover plate 40 and are likewise secured thereto by welding. The welding may be in the form of a continuous weld radially along the abutting portions of the webs and cover plates or the welding may be at intermittent points as will be readily understood. The circumferential spacing of the vane forming members C provide circumferentially spaced fluid conducting passages D, these passages being open at their inner ends with the chamber 42 and at their outer ends communicating with the chamber 43.

The impeller A is likewise formed with the vane forming circumferentially spaced members C providing a series of similar fluid conducting passages likewise communicating with the chambers 42 and 43. After the parts have been assembled as illustrated in Figs. 1 and 2 and the space between the flywheel 11 and outer cover plate 13 has been filled or partially filled with the fluid medium, the impeller A will rotate with the driving flywheel to cause the fluid to circulate under the action of centrifugal force from space 42 outwardly through the impeller vane passages for discharge at the space 43 where the fluid enters the runner vane passages for discharge at the space 42. The runner is thus driven from the impeller and the slip between the parts rapidly diminishes as the speed of the impeller increases. It will be observed that the fluid space between the flywheel 11 and outer cover plate 13 and particularly the enclosure defined further by the disc 35 and hubs 27 and 25 are substantially free from projections, screws, bolts, etc., which produce noises and friction losses as the fluid is rapidly circulated within the coupling. Furthermore, it will be noted that the bounding faces of the fluid passages D will likewise provide for smooth flow of the fluid with resulting relatively high efficiency of power transmission; especially in providing for free slippage of the coupling at low speed.

Referring now to the modified construction of the rotor B' illustrated in Figs. 3 to 6, it will be noted that I have provided the outer and inner dished cover plates 31ᵃ and 40ᵃ which correspond in general with the aforesaid cover plates 31 and 40 respectively of the runner B in Figs. 1 and 2. The runner B' may be mounted by the annular flange 34 of the driven plate 35 as previously described in connection with Fig. 1, it being understood that the runner B' may be substituted for the runner B in the assembly of Fig. 1. Intermediate the inner and outer cover plates are the vane forming members C' having the radially extending vane portions 44ᵃ secured in place by interlocking tongues and grooves. Thus, the outer cover plate 31ᵃ is provided with a series of circumferentially spaced rearwardly extending tongues or projections 47. These tongues are provided with a slot 48 best shown in Fig. 5, each tongue 47 being thereby formed with a pair of adjacent tongue portions. The adjacent corner of each vane portion 44ᵃ is formed with a notch 49.

In assembly the vane portions 44ᵃ are radially aligned with the respective slots 48 of the tongues 47, the tongues being return bent from the dotted line positions thereof shown in Figs. 3 and 5 to occupy the solid line positions shown in these figures with the vane portions 44ᵃ entering the slots 48 to position the companion tongue portions of each tongue 47 at opposite sides of the vane portion 44ᵃ as best seen in Fig. 5. The notch 49 accommodates the return bent tongues thereby securely locking the parts and also avoiding otherwise objectionable portions of the structure which might extend beyond the vanes and disturb the fluid flow by producing eddy currents and inefficiencies at such regions.

The inner peripheral edge of the outer cover plate 31ᵃ is formed with a similar series of return bent tongues 47 in a manner corresponding to the aforesaid assembly of the tongues carried by the outer peripheral edge of the outer cover plate.

While the vane portions 44ᵃ may be secured to the inner cover plate 40ᵃ in a manner similar to that previously described for connecting the vane portions to the outer cover plate 31ᵃ, I have illustrated a further form of novel tongue and groove connection having the advantage of providing increased smoothness of fluid flow since the return bent tongues are removed from the path of the fluid circulating through the radial passages provided by adjacent vane portions 44ᵃ. The vane portions 44ᵃ are each formed with an inner circumferentially bent web or flange 46ᵃ extended at its opposite ends beyond the vane portions to provide tongues 50 adapted during assembly to be return bent around and beneath the inner and outer edges of the inner cover plate 40ᵃ as best seen in Figs. 3, 4, and 6. The circumferentially extending edges of the inner cover plate 40ᵃ are each provided with a series of spaced notches 51 aligned with the tongues 50 and receiving the tongues when bent around the edges of the cover plate to securely lock the vane portions 44ᵃ against circumferential or radial displacement. It will be apparent that the return bent tongues 50 terminate in the vortex chamber 41ᵃ to provide smooth flow of the fluid entering and leaving the passages D' indicated in Fig. 4. The notches 51 are preferably sufficiently deep to receive the return bent tongues 50 and provide a substantially continuous edge along the inner and outer peripheries of the inner cover plate 40ᵃ.

Referring now to the form of my invention illustrated in Figs. 7 to 10, I have illustrated a portion of one of the rotors of this modified form in Fig. 7. This rotor has the inner and outer cover plates 40ᵇ and 31ᵇ respectively, these cover plates receiving the intermediate circumferentially spaced vane forming sheet metal stamped members C². This rotor may be designated as B² and the fastening which I have illustrated between the members C² and the inner and outer circumferential edges of the inner cover plate 40ᵇ is identical with the corresponding fastening previously described in connection with Figs. 3, 4, and 6. Thus the similar reference numerals applied to the tongues 50 and notches 51 are the same as previously described. The members C² have vane portions 44ᵇ formed with an outer flanged web 45ᵇ shaped to contact with the inner surface of the outer cover plate 31ᵇ. At circumferentially spaced points adjacent the vane portions 44ᵇ the webs 45ᵇ have outwardly offset terminal portions 52 at each terminal circumferential edge thereof and notches 53 corresponding to the aforesaid notches 49 in the Fig. 3 embodiment.

The outer cover plate 31ᵇ has correspondingly outwardly offset portions 54 at spaced circumferential points around the inner and outer terminals thereof, the portions 54 having the tongue extensions 47ᵇ adapted on assembly to be return bent from the dotted positions shown in Figs. 7 and 9 into the solid line positions shown in these figures. The tongues 47ᵇ each have a slot 48ᵇ for receiving the associated web vane portions 44ᵇ, the inwardly bent terminal portions of the tongues 47ᵇ occupying the spaces provided by reason of the outwardly offset portions 52 of the webs 45ᵇ as best shown in Fig. 7 whereby these terminal tongue portions substantially form an uninterrupted continuous surface with the inner surfaces of the associated webs 45ᵇ. In this manner I have provided for smooth substantially uninterrupted fluid flow along the portions of the fluid passages D² bounded by the return bent tongues 47ᵇ adjacent the fluid inlet and outlet of the runner rotor B².

In the various embodiments of my invention hereinbefore illustrated and described in detail, it will be apparent that I have provided several embodiments of my improved fluid coupling rotor formed of sheet metal parts so fabricated to provide a relatively light-weight assembly capable of manufacture at relatively low cost, the assembly at the same time having a great degree of rigidity and resistance to displacement of the component parts under the influence of the fluid medium circulated at relatively high velocity as well as the centrifugal forces incident to rotation of the rotor itself, and distorting influences of the heat generated in the coupling.

Referring now to Fig. 11, I have illustrated a modified form of my rotor mounting and sealing means, the structure illustrated in Fig. 11 being adapted for mounting the fluid coupling rotors illustrated in Figs. 1, 3 or 7 or other suitably constructed rotors.

In Fig. 11 the driven shaft 12' is formed forwardly thereof with the splines 28' to drivingly connect the hub 27' formed with the rearwardly extending cylindrical sleeve portion 55. Adjacent the forward end of the hub 27' the latter is formed with a flange 56 connected by fasteners 57 to the plate 35' which carries the runner, a portion of which is illustrated at B³.

The impeller A³ has its outer cover plate 13' formed with the inwardly extending annular shoulder 20' which has the forward cylindrical housing portion 58 terminating in the inwardly extending annular retaining flange 59. Adjacent the rear face of the portion 20' I have located a retaining ring 60 and adjacent the retaining ring is the flange 61 of the outer housing member 62, the latter having an opening 23' through which the shaft 12' extends. Suitable fasteners 63 serve to rigidly connect the portion 20' with the ring 60 and flange 61, these fasteners preferably having rivet-like heads 64 exposed to the fluid medium within the coupling in order to minimize noises and friction losses incident to the movement of the fluid within the coupling, and to provide the aforesaid high degree of slippage at low speed where slippage is desired.

Intermediate the sleeve 55 and housing 58 I have provided the ball bearing and race assembly 65, the flange 59 cooperating with the inwardly extending end of the ring 60 to house and fix the outer portion of the ball bearing assembly in proper position, a shoulder 66 of the hub 27' likewise cooperating with a sleeve 67 to hold the inner member of the ball bearing assembly in the desired position on the hub 27'. The sleeve 67 is secured in place surrounding the sleeve portion 55 of the hub 27' by a threaded nut 68 carried by the rear end of the sleeve portion 55.

In order to seal the opening 23' against the escape of the fluid medium I have provided a sealing bellows member 69 having the forward and rearward sealing ring assemblies 70 and 71 respectively, the rear sealing ring 71 engaging the inwardly turned terminal portion of the housing member 62 and the forward ring 70 tightly fitting against the sleeve 67 and the inner member of the ball bearing assembly 65. In order to assist the sealing action of the rings 70 and 71 I have provided the coil spring 72 which acts to yieldingly separate these rings. The parts secured by the fasteners 63 may be formed of sheet metal stampings.

Various modifications and changes will be readily apparent from the teachings of my invention, as set forth in the appended claims, and it is not my intention to limit my invention to the particular details of construction and operation shown and described for illustrative purposes.

What I claim is:

1. In a fluid coupling rotor, spaced inner and outer cover structures, one of said structures having a slot in an edge thereof, and means for connecting said cover structures including an element intermediate said cover structures, said element having a vane portion and a web portion, said web portion having a return-bent tongue engaging said slot.

2. In a fluid coupling rotor, spaced inner and outer cover structures, one of said structures having circumferentially spaced slots in an edge thereof, and means for connecting said cover structures including a plurality of fluid passage forming elements intermediate said cover structures, said elements each having a vane portion and a web portion angled therefrom, said web portions each having a tongue return-bent in one of said slots.

3. In a fluid coupling rotor, axially spaced inner and outer substantially similar dished annular cover structures, one of said structures having a circumferentially extending edge thereof provided with a series of slots, and means for connecting said cover structures including a plurality of circumferentially spaced fluid passage forming elements intermediate said cover structures, said elements having arcuate substantially radially extending vane portions and web portions angled therefrom, said web portions being return-bent in said slots respectively.

4. In a fluid coupling rotor, spaced inner and outer cover structures, and means for connecting said cover structures including a fluid passage forming member intermediate said cover structures, said passage forming member having a vane portion, one of said cover structures having a slotted tongue return-bent into locking engagement with said passage forming member, said vane portion having a notched edge engaged by said slot.

5. In a fluid coupling rotor, axially spaced inner and outer dished annular cover structures, and means for connecting said cover structures including a fluid passage forming member having a substantially radially extending arcuate vane intermediate said cover structures, said passage forming member having a web angled from said vane and engaging a terminal portion of one of said cover structures, the last said cover structure having a tongue return-bent into locking engagement with a terminal portion of said web, said engaging portions of said web and cover being offset to position the end of said return bent tongue substantially in continuity with the web adjacent said terminal portion thereof.

6. In a fluid coupling rotor, axially spaced inner and outer dished annular cover structures, and means for connecting said cover structures including a fluid passage forming member having a substantially radially extending arcuate vane intermediate said cover structures, said passage forming member having a web angled from said vane and engaging a terminal portion of one of said cover structures, the last said cover structure having a tongue return-bent into locking engagement with a terminal portion of said web, said engaging portions of said web and cover being offset to position the end of said return-bent tongue substantially in continuity with the web adjacent said terminal portion thereof, said vane having a notched edge engaged by said tongue.

7. In a fluid coupling rotor, spaced inner and outer dished cover structures, one of said cover structures having a series of circumferentially spaced notches in a circular edge thereof, and means connecting said cover structures including a plurality of generally radially extending vanes, each of said vanes having a tongue deflected into securing engagement with one of said notches.

8. In a fluid coupling rotor, spaced inner and outer dished cover structures, one of said cover structures having a series of circumferentially spaced slotted tongues around a circular edge thereof, and means connecting said cover structures including a plurality of radially extending vanes, each of said slotted tongues being deflected into securing engagement with one of said vanes, with each tongue slot receiving a vane, portions of each of said tongues adjacent the slot thereof engaging opposite sides of the vane engaged thereby.

9. In a fluid coupling rotor, spaced inner and outer dished cover structures, one of said cover structures having a series of circumferentially spaced slotted tongues around a circular edge thereof, and means connecting said cover structures including a plurality of radially extending vanes, each of said slotted tongues being deflected into securing engagement with one of said vanes, with each tongue slot receiving a vane, portions of each of said tongues adjacent the slot thereof engaging opposite sides of the vane engaged thereby, each of said vanes having a notch receiving a portion of the slot of one of said tongues.

10. In a fluid coupling rotor, axially spaced inner and outer substantially similar dished annular cover structures, one of said structures having a circumferentially extending edge thereof provided with a series of slots, and means for connecting said cover structures including a plurality of circumferentially spaced fluid passage forming elements intermediate said cover structures, said elements having arcuate substantially radially extending vane portions and web portions angled therefrom, said web portions being deflected into said slots respectively.

WILLIAM T. DUNN.